Feb. 11, 1941.      H. FORD      2,231,710
TRACTOR
Filed Feb. 23, 1939      2 Sheets-Sheet 1

WITNESS
E. Nitzke

INVENTOR
Henry Ford
E. L. Davis
BY E. C. McRae
ATTORNEY

Feb. 11, 1941.    H. FORD    2,231,710
TRACTOR
Filed Feb. 23, 1939    2 Sheets-Sheet 2

INVENTOR
Henry Ford
BY E. L. Davis
E. C. McRae
ATTORNEY

WITNESS

Patented Feb. 11, 1941

2,231,710

UNITED STATES PATENT OFFICE 2,231,710

TRACTOR

Henry Ford, Dearborn, Mich., assignor to Ford Motor Company, Dearborn, Mich., a corporation of Delaware Application February 23, 1939, Serial No. 257,773

1 Claim. (Cl. 180—41)

The object of my invention is to provide a tractor of simple, durable and inexpensive construction.

A further object of my invention is to provide a tractor having a novel wheel suspension which differs from the conventional tractor in that all of the wheels may be raised or lowered relative to the tractor. When the wheels are in their lowermost positions, maximum clearance above the ground is provided so that the tractor may be used for culitvating relatively tall corn and similar crops. When the wheels are in their upper positions, the center of gravity of the tractor is lowered to thereby increase the draw-bar pull of the tractor.

With these and other objects in view, my invention consists in the arrangement, construction and combination of the various parts of my improved device, as described in the specification, claimed in my claim, and illustrated in the accompanying drawings, in which:

Figure 1:
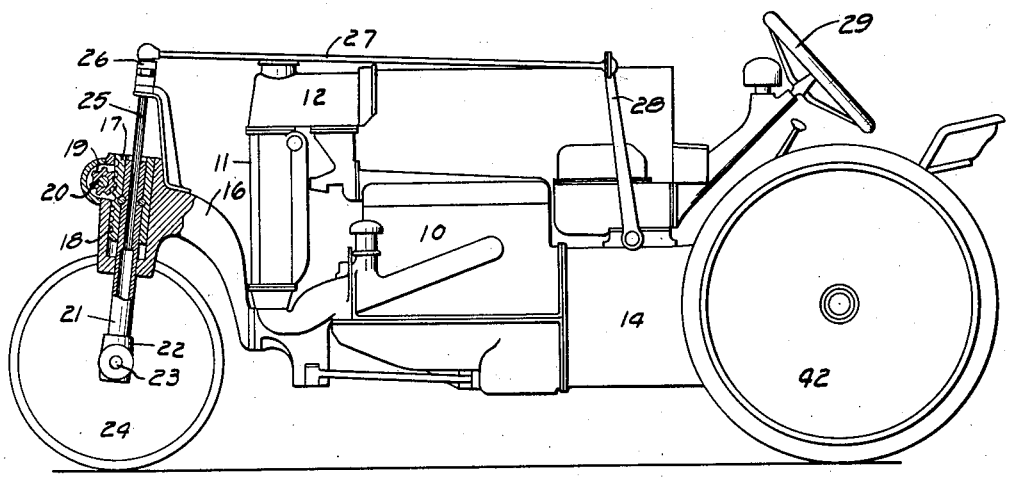
Figure 1 is a side elevation of my improved tractor, a portion of the steering mechanism being broken away to better illustrate the construction.
Figure 5:
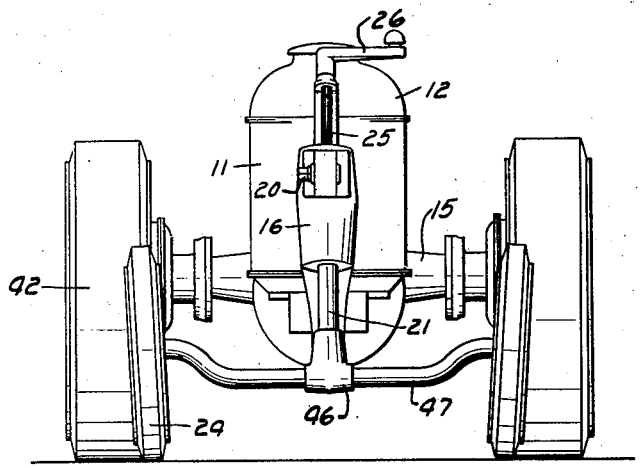
Figure 5 is a front view of an alternate construction, this unit being supplied with an axle which is detachably secured to the front steering spindle in place of the axle shown in Figure 1.

Referring to the accompanying drawings, I have used the reference numeral 10 to indicate a conventional tractor internal-combustion engine having a radiator 11 secured to the forward end thereof. A water reservoir 12 is fixed to the upper portion of the radiator 11 and a fuel tank 13 extends from the rearward portion of the reservoir 12 rearwardly in the conventional manner. An axle and transmission housing 14 is fixed to the rear end of the engine 10, and axle tubes 15 extend outwardly from the respective sides of the rear portion of the housing 14.

A goose neck bracket 16 is fixed to the front end of the engine 10 and is adapted to support the tractor upon the front wheels. The upper end of the bracket 16 is provided with a vertical bore therethrough in which a quill 17 is reciprocally mounted. Gear teeth 18 are machined in the form of a rack upon one side of the quill 17, these teeth being in mesh with a pinion 19, which pinion is rotatably mounted in the upper end of the bracket 16 upon a shaft 20. One end of the shaft 20 is squared so that a wrench may be applied thereto to rotate the pinion 19 thereby raising or lowering the quill 17 in the bracket 16. A vertically extending king-pin 21 is rotatably mounted in the quill 17 but is prevented from axial movement relative thereto. Consequently, when the quill 17 is raised or lowered the pin 21 is correspondingly raised and lowered.

A head 22 is detachably secured to the lower end of the pin 21, which head is provided with a pair of wheel spindles projecting from the respective sides thereof, upon which spindles wheels 24 are rotatably mounted. The upper end of the pin 21 is provided with splined bore therein in which a splined shaft 25 is fixed. The upper end of the shaft 25 has a steering arm 26 secured thereto. Consequently, when the arm 26 is oscillated the wheels 24 will be turned to steer the tractor. A drag link 27 extends from the outer end of the arm 26 rearwardly where it is secured to the upper end of a steering arm 28. The lower end of the arm 28 is pivotally mounted upon the upper portion of the transmission housing 14 and a conventional steering reducion gear is provided which oscillates the arm 28 forwardly and back in accordance with the rotation of a steering wheel 29.

Figure 2:
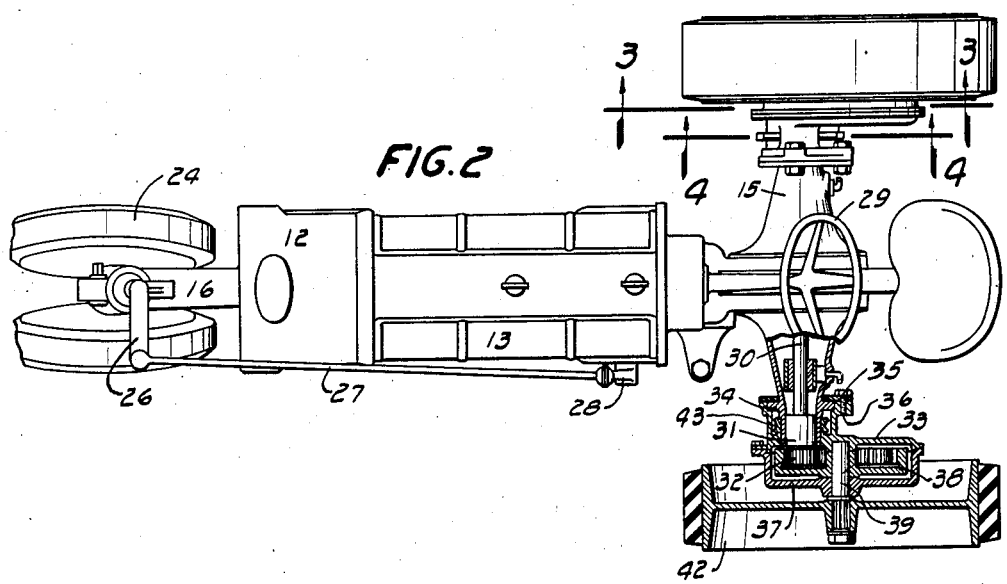
Figure 2 is a plan view of the tractor shown in Figure 1.
Figure 3:
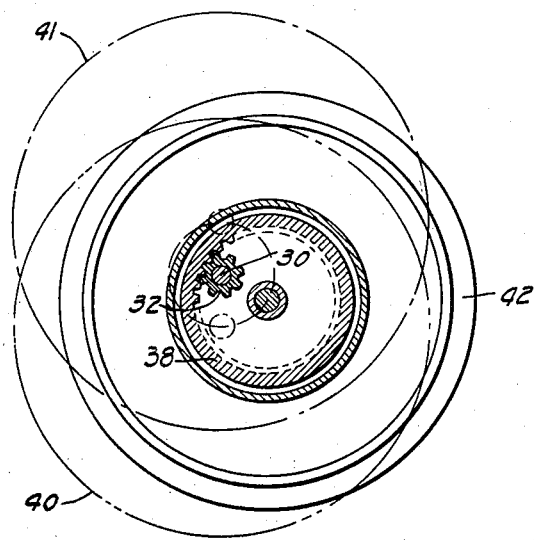
Figure 3 is a sectional view, taken upon the line 3—3 of Figure 2.
Figure 4:
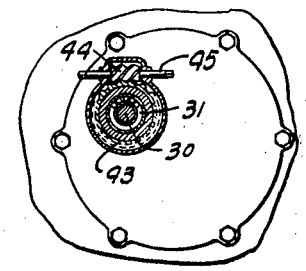
Figure 4 is a sectional view, taken upon the line 4—4 of Figure 2.

Referring to Figures 2 and 3 of the drawings, I have shown a reduction gearing through which the tractor is driven. Rear axle shafts 30 extend outwardly from the respective sides of a conventional differential, not shown, but which is mounted within the housing 14. The outer end of each shaft is supported upon a bearing 31 which is in turn supported by the outer end of the adjacent axle tube 15. Pinions 32 are fixed to the outer ends of the shafts 30.

It will be noted from Figure 2 that a housing 33 is rotatably mounted upon the outer end of each tube 15, which housings are held in place by a flange 34 formed on each tube against which a plate 35 is clamped by means of cap screws 36. Each housing 33 is formed of two parts with an outer drum 37 forming an enclosure for an internal gear 38, which gear is fixed to a stub-axle shaft 39. Each shaft 39 is rotatably mounted in suitable bearings in the drum 37 and in the housing 33 in such position that the internal gear 38 is in mesh with the pinion 32.

It will be noted that the axis of each shaft 39 is parallel to but is displaced rearwardly from the axis of the pinion 32. Consequently, each housing 33 may be lowered to the position shown by lines 40 in Figure 3 or it may be swung upwardly to the position shown by lines 41. The housing may, of course, be retained in any intermediate position as shown by the full lines in Figure 3. A driving wheel 42 is fixedly secured to the outer end of each shaft 39 and swings up and down as the housing 33 is oscillated around the axle tube.

Inasmuch as the housings 33 are supported upon their respective axle tubes independently of each other, it will be readily seen that they both may oscillate simultaneously or independently, as desired. When the housings are moved to their lowermost position, as shown by lines 40, then the rear portion of the tractor is elevated a considerable distance above the position that it assumes when the housings are rotated to the position shown by lines 41. The purpose of raising the rear end of the tractor is to obtain clearance under the axle tubes when it is desired to cultivate crops of a considerable height as the crops must pass beneath the axle tubes. When ploughing or doing other work requiring the maximum draw-bar pull by the tractor such pull may be increased by lowering the center of gravity. The front end of the tractor may be conveniently raised or lowered by means of the pinion 19 in accordance with the position of the rear end so that the tractor will remain on an even level over all ranges of adjustment.

Another important feature of this construction is that when ploughing is being done it is necessary that one of the drive wheels remain at the bottom of the furrow while the other rolls upon the unploughed surface. Consequently, all other tractors have a list to one side when being used for this work. With my improved tractor, the wheel which is riding in the furrow may be lowered thereby permitting the tractor to remain level. This also produces greater tractor effort on the wheels because the wheel treads remain flat on the ground.

In order to conveniently raise and lower each housing 33, I have provided a worm wheel 43 which is fixed on the outer end of each axle tube 15. A worm gear 44 is rotatably mounted in each housing 33 upon a shaft 45 in mesh with the worm 43 so that when the shaft 45 is rotated the housings are swung up and down at a reduced rate by the worms 44.

In the cultivation of certain crops it is necessary that the steering wheels 24 be spread as they interfere with the center row of crops. In this case I have provided an auxiliary head 46 which has a solid axle shaft 47 extending crosswise through the bottom thereof. The head 22 may be removed from the pin 21 and replaced by the head 46. The wheels 24 are then mounted upon suitable wheel spindles at the outer ends of the axle shaft 47 to thereby provide a standard tread for the front end of the tractor. A conventional front axle may also be used if desired.

Among the many advantages arising from the use of my improved construction, it may be well to mention that the principal advantage results in that the center of gravity of the tractor may be lowered close to the ground when heavy work is being done but if cultivating or work which requires considerable clearance over the axle is to be done then the tractor may be raised an appreciable distance to accomplish this purpose.

Some changes may be made in the arrangement, construction and combination of the various parts of my improved device without departing from the spirit of my invention and it is my intention to cover by my claim such changes as may reasonably be included within the scope thereof.

I claim as my invention:

A tractor comprising, an engine, an axle housing secured to one end of said engine, an axle tube extending transversely from the end of said axle housing opposite said engine, an axle shaft extending outwardly through said axle tube, a pinion disposed upon the outer end of said shaft, a gear housing having a cylindrical sleeve projecting from one side thereof, the axial center of said sleeve being spaced radially from the axial center of said gear housing, said sleeve being rotatably mounted upon the outer end of said axle tube, a flange formed on said axle tube which coacts with and supports the inner end of said sleeve, means disposed upon the inner end of said sleeve which operatively engages said flange to lock said sleeve in any one of a plurality of rotatable positions around said axle tube, a worm wheel fixed upon said axle tube within said sleeve, a worm shaft rotatably mounted in said sleeve transverse to its axial center, said worm shaft having a worm fixed thereon which meshes with said worm wheel so that rotation of said worm shaft rotates said sleeve and worm around said axle tube, a wheel shaft rotatably mounted within said housing upon its axial center, a driving wheel fixed to the outer end of said wheel shaft, and an internal gear fixed to said shaft within said housing, said internal gear being in mesh with said pinion.

HENRY FORD.